United States Patent [19]

Kirkpatrick

[11] Patent Number: 4,958,064

[45] Date of Patent: Sep. 18, 1990

[54] BAR CODE LOCATOR FOR VIDEO SCANNER/READER SYSTEM

[75] Inventor: Robert D. Kirkpatrick, Farmers Branch, Tex.

[73] Assignee: Image Recognition Equipment Corporation, Richardson, Tex.

[21] Appl. No.: 302,012

[22] Filed: Jan. 30, 1989

[51] Int. Cl.⁵ ............................................. G07B 15/02
[52] U.S. Cl. .................................. 235/384; 235/462; 235/470
[58] Field of Search .................... 235/384, 462, 470

[56] References Cited

U.S. PATENT DOCUMENTS

| | | |
|---|---|---|
| 4,044,227 | 8/1977 | Holm et al. |
| 4,603,390 | 7/1986 | Mehdipoor ........................ 235/384 |
| 4,652,733 | 3/1987 | Eng et al. ........................... 235/462 |
| 4,689,490 | 8/1987 | Thomas et al. ..................... 250/566 |
| 4,728,784 | 3/1988 | Stewart .............................. 235/462 |

*Primary Examiner*—Harold I. Pitts
*Attorney, Agent, or Firm*—Dennis T. Griggs; Richard L. Schwartz

[57] ABSTRACT

A target locator having a group of uniquely configured, high contrast elements is displayed adjacent one or more target bar codes for increasing the probability of acquiring a target bar code of interest and extending the range at which a target bar code of interest can be acquired and read. The high contrast locator elements are arranged in a pattern which is unlikely to occur in nature, and the width and spacing of the target locator elements are substantially greater than the comparable bar width and spacing of elements within the target bar code of interest. A comparison of grey scale pixel values is used to validate whether a candidate bar code locator actually corresponds with reference target locator data stored in memory. When the card is displayed adjacent a second bar code of interest, the two bar codes of interest can be scanned within the same field of view.

12 Claims, 4 Drawing Sheets

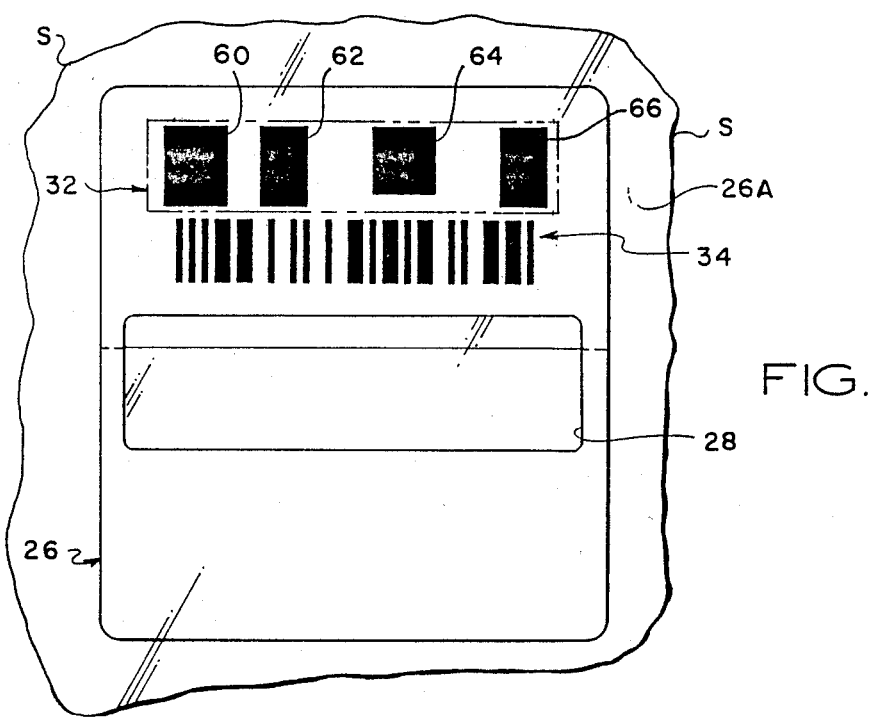
FIG. 9
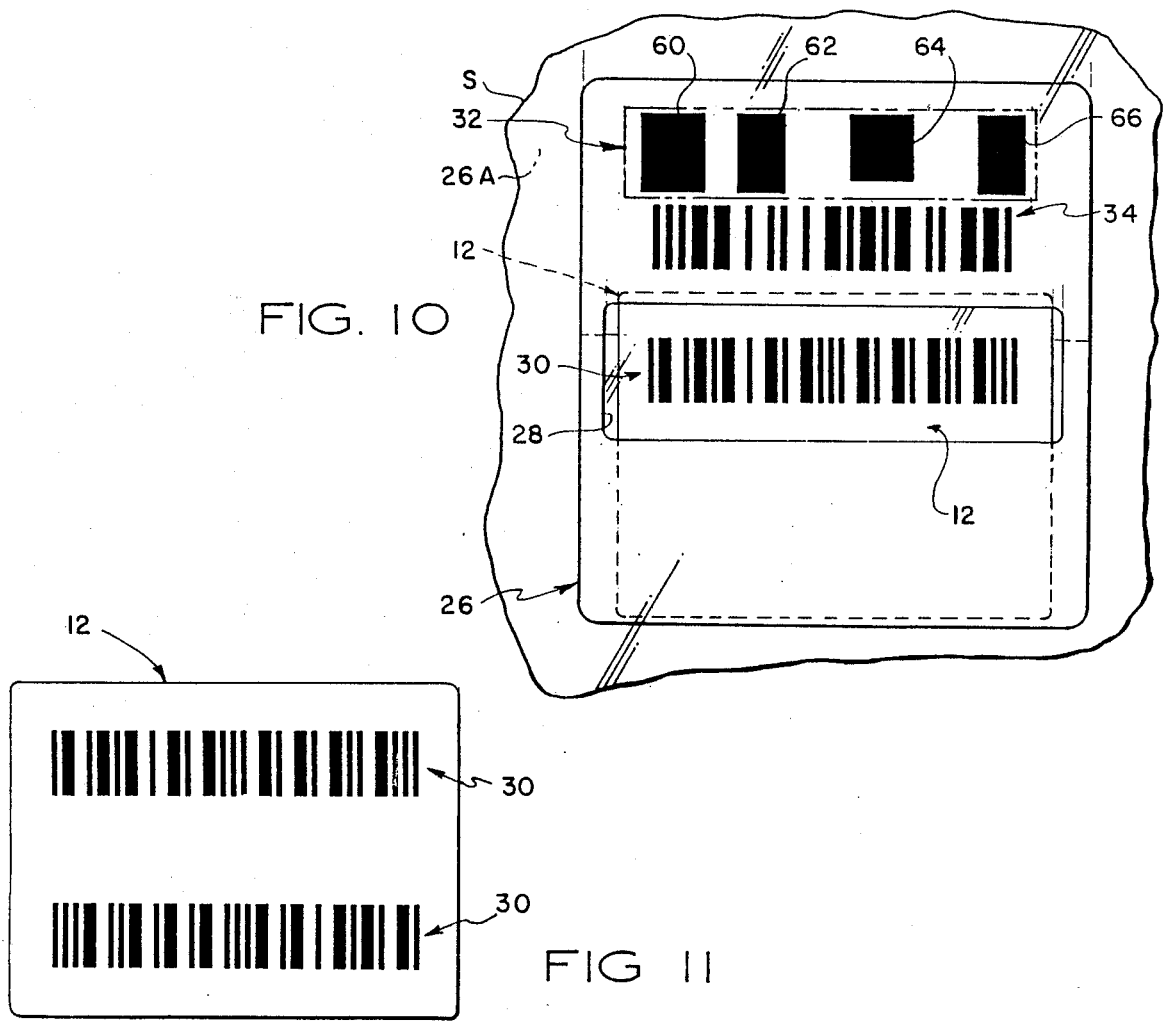
FIG. 10
FIG 11

BAR CODE LOCATOR FOR VIDEO SCANNER/READER SYSTEM

FIELD OF THE INVENTION

This invention relates generally to bar code reading systems, and in particular to a bar code locator for assisting acquisition of a target bar code of interest.

BACKGROUND OF THE INVENTION

Bar codes and their associated reader/scanner systems are widely used in manufacturing, shipment and inventory control of various products and equipment, to assist in document control, article handling systems and security/access control systems. Bar code reading and scanning systems have been developed to scan and decode standard bar code formats and to generate digital representations to be used as inputs, typically to computer directed processing and control equipment.

Conventional bar code reading systems scan and read the printed bar code formats and decode the elements (i.e., the bars and spaces) represented by the printed bar code format. A typical printed bar code format includes multiple parallel bars of varying widths which are separated by a number of spaces of varying widths, prearranged to represent a string of digits in a known, encoded form. Conventional bar code reading systems scan the parallel bars along a transverse scan path which is substantially perpendicular to the parallel bars. The scan can be made in either direction, with the reading system being constrained, however, to read only encoded bar code formats which have been precisely printed as a bar code label. The preprinted label must contain a predetermined, standard bar code format pattern which is recognizable by the bar code reading system. Conventional bar codes conform with A.N.S.I., I.S.O., or A.F.N.O.R. national/international standards Examples of conventional preprinted, preencoded bar code formats which comply with such standards include UPC, CODE-A-BAR, Code 39, and Interleaved 2 of 5.

DESCRIPTION OF THE PRIOR ART

Some reader/scanner systems require automatic reading of bar code information carried on various movable objects, such as manufactured products transported along an assembly line, baggage handling conveyor systems, and vehicles such as railroad rolling stock.

In video reader/scanner systems which are designed to read bar code information carried on a moving object, the video camera must search and evaluate bar code information which may be randomly oriented with respect to the scanning path. In some applications, the moving object is remotely located at a distance exceeding the focal length of the scanning camera, and the scanning field may contain background clutter or scattered light which interfere with the acquisition and detection of the bar code.

If an extraneous mark or an apparent void are detected during a scan by a conventional bar code reader, the reading system will attempt to process the extraneous bars and spaces. That attempt will result in a false reading or a failure to read the bar code information. Because the entire field must be scanned continuously for detecting a moving carrier, a large number of data must be evaluated which lie outside the information of interest. Thus the scanning computer will be loaded by a large number of irrelevant signals, thereby reducing evaluation and recognition speed. In some instances, the level of the background optical clutter may be sufficient to completely mask or otherwise obscure the target bar code and thereby prevent or otherwise delay acquisition.

For some applications, it is desirable to differentiate certain bar code carriers with respect to others and selectively read the bar code information displayed only on a specific carrier which is surrounded by multiple carriers, either movable or fixed. Such carriers may be of no interest, or may be members of an exclusion group, whose bar code information is of no interest, not relevant or have been deliberately excluded from the processing operation. When multiple bar code targets of two or more categories are presented within the scanning field, a substantial delay may be experienced in the acquisition of a desired target bar code.

A further limitation on the acquisition of bar code targets carried by moving objects within a scanning field is that at distances exceeding four to five feet, most bar codes are not readable by commercially available video cameras having fixed focal length lenses. That is, for bar code targets presented at a distance greater than the focal length of the scanning lens, the narrow bar elements cannot be detected since their optical resolution is less than one pixel in width. Accordingly, a substantial delay in target bar code acquisition will be experienced until such time as the moving carrier object traverses the scanning zone within the focus range of the scanning lens.

OBJECTS OF THE INVENTION

The principal object of the present invention is to provide method and apparatus for unambiguously identifying a bar code carried by an object within an optically cluttered background.

A related object of the invention is to provide an improved method and apparatus for increasing the probability of acquiring a target bar code of interest.

Another object of this invention is to provide an improved method and apparatus for differentiating a desired target bar code carried by an object within a scanning field containing multiple other objects having readable bar code information.

Yet another object of this invention is to provide a bar code reference locator whereby two or more bar codes within a given view field can be scanned and read for purposes of establishing a match or correlation between conditions or information represented by said bar codes, while ignoring other bar codes displayed within the same view field.

Still another object of this invention is to provide an improved scanning method and apparatus for extending the range at which a target bar code can be acquired and read.

Another object of this invention is to provide an improved method and apparatus for establishing the boundary points of a target bar code.

A related object of this invention is to provide an improved system and method for detecting the unauthorized possession of mobile or portable property such as an automobile.

SUMMARY OF THE INVENTION

According to the preferred embodiment of the present invention, the foregoing objects are achieved by associating a group of uniquely configured, high contrast target locator elements adjacent to a bar code, with the high contrast locator elements being arranged in a pattern which is unlikely to occur in nature. The width and spacing of the locator elements are substantially greater than the comparable bar width and spacing of elements within the bar code. The locator elements are uniquely configured in the sense that the relative widths of the elements and their spacing distances bear a predetermined relation to each other.

A video reader system performs real time calculations referenced to the locator elements to determine the corner location points of the bar code of interest A one dimensional scan by the video camera across a target field is converted in real time to a sequence of bars and spaces whose widths are measured. When a sequence of the correct number of bars and spaces is found such that the relationship among the widths of the bars and spaces corresponds to the known, predetermined width ratios of the target locator, a candidate bar code is found. Further processing involving a comparison of grey scale pixel values is then used to validate whether the candidate locator actually represents a true target locator Upon validation, the corner boundary points of a rectangle which frames the target bar code of interest are computed, and the framed target bar code is then read.

BRIEF DESCRIPTION OF THE DRAWINGS

The novel features of the invention are set forth with particularity in the claims. The invention will best be understood from the following description when read in conjunction with the accompanying drawings, wherein:

FIG. 9 is a view similar to FIG. 3 which illustrates an alternate carrier pocket arrangement;

FIG. 10 is a view similar to FIG. 3 showing an operator credentials card loaded into the pocket carrier of FIG. 9; and, FIG. 11 is a view similar to FIG. 4 which illustrates an alternative credentials card arrangement.

DETAILED DESCRIPTION OF THE PREFERRED EMBODIMENT

In the description which follows, a bar code reader/scanner system and target locator are described as used for detecting the unauthorized possession of an automobile The reader/scanner system, together with the unique bar code target locator, can be adapted to a wide variety of other applications including security, surveillance, material handling, and access/entry control Other applications may include, for example entry control into a parking area, control of personnel entrances and/or elevators, control and accountability of personnel within a classified or restricted access area, controlled access and automatic billing of vehicular traffic on tollroads or bridges, and surveillance of personnel carrying bar coded badges.

Figure 1:
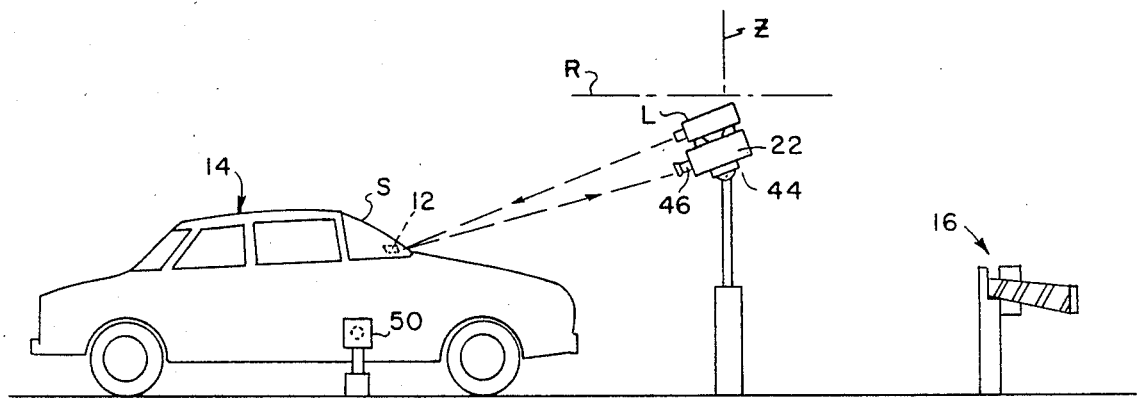
FIG. 1 is a simplified perspective view which illustrates use of the bar code target locator in combination with a video scanning system for detecting unauthorized possession of a vehicle attempting to cross a restricted travel zone.
Figure 2:
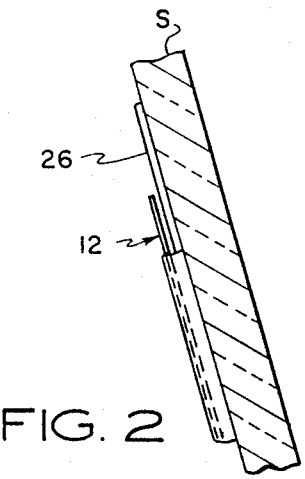
FIG. 2 is a sectional view taken through a portion of the windshield of the automobile shown in FIG. 1, illustrating the attachment of a credentials card carrier pocket onto the inside surface of the windshield.
Figure 6:
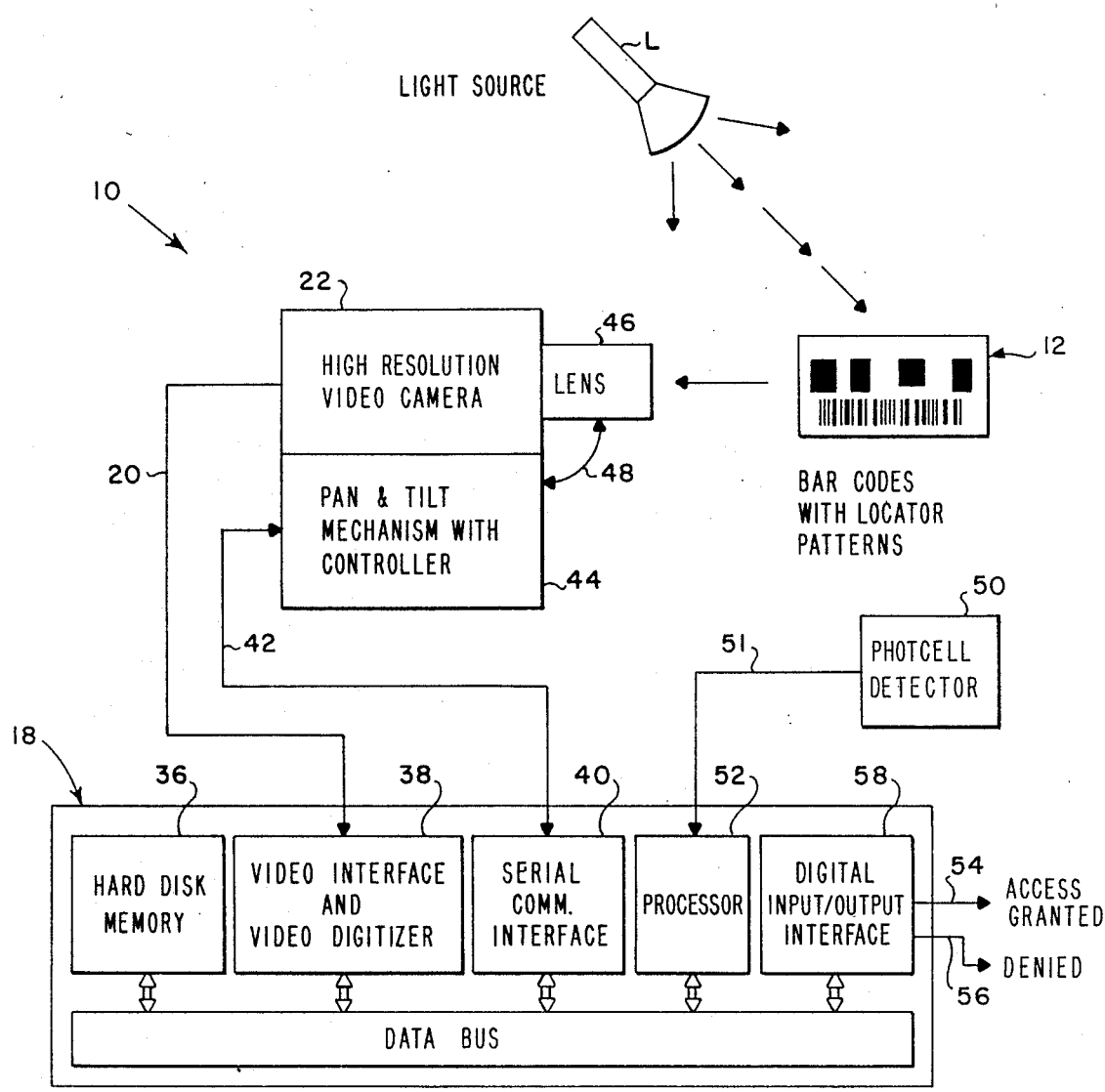
FIG. 6 is a simplified block diagram of the scanner/reader system of the present invention.

Referring now to FIGS. 1 and 6, a video reader/scanner system 10 is utilized in combination with a bar code card 12 carried on the front windshield S of an automobile 14 to grant or deny passage of the automobile across a checkpoint gate 16. One purpose of the system 10 is to detect stolen motor vehicles at controlled access points without significant interference with the flow of traffic. The reader/scanner system 10 accomplishes this task by utilizing a digital computer 18 which digitizes a video signal 20 generated by a scanning camera 22 for detecting and reading bar code information within the scanning field of the camera 22. The controlled access operation involves locating and capturing the image of bar code data carried by the automobile with the video camera 22, digitizing the bar code video signal 20, processing that data in the digital data computer 18, comparing the bar code data with information contained within a master data base file for verification, and then granting or denying access.

The bar code credentials card 12 is positioned against the interior surface of the windshield S so that bar code data is displayed and visible to the observation video camera 22. The credentials card 12 is inserted within a pocket 24 of an envelope 26 which is adhered to the inside windshield surface. The envelope 26 has a side window 28 through which bar code information carried by the credentials card 12 is displayed through the windshield S.

Figure 3:
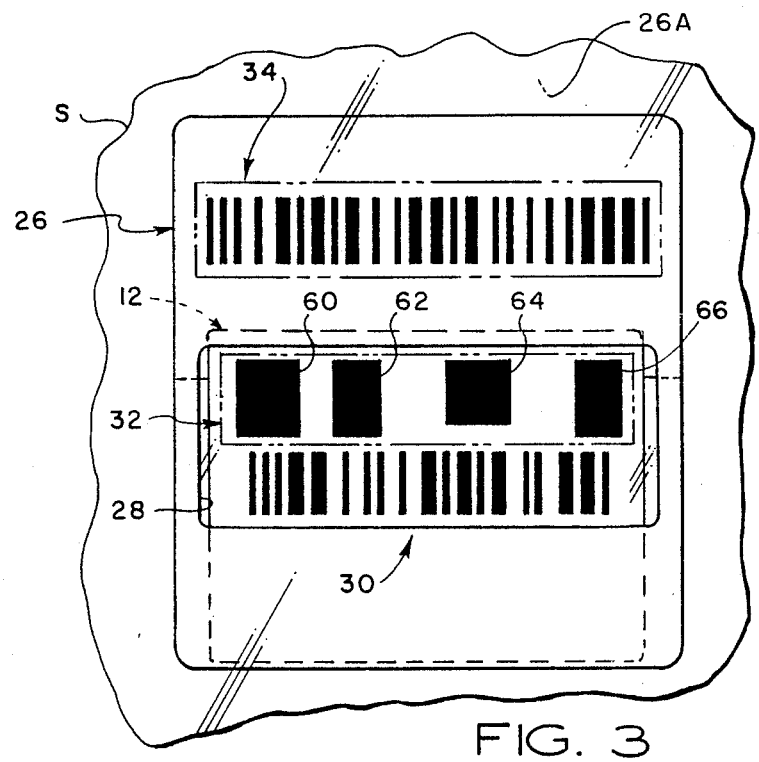
FIG. 3 is an elevation view of the windshield and underlying operator credentials card and carrier pocket display.
Figure 4:
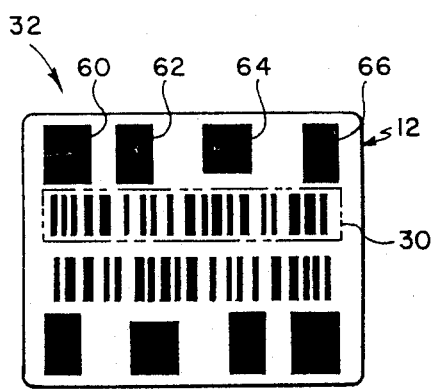
FIG. 4 is an elevation view of the operator credentials card showing bar code elements and target locator elements.
Figure 5:
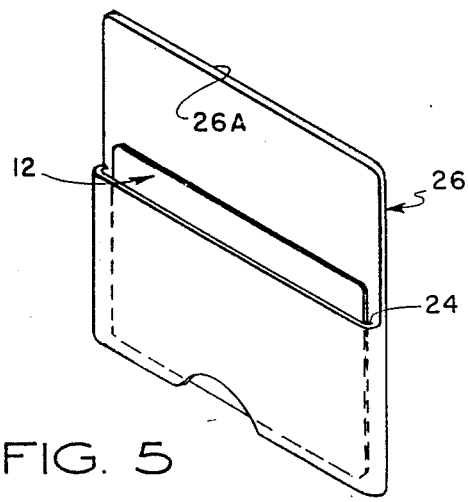
FIG. 5 is a rear perspective view of the credentials card pocket in which an operator credentials card has been inserted.

Referring to FIGS. 3 and 4, the credentials card 12 has a bar code data strip 30 and a target locator group 32 which is positioned directly above the bar code data strip 30. As indicated in FIG. 4, the bar code data strip 30 and target locator group 32 are printed in inverted relation on the lower half of the credentials card 12 so that the bar code data and elements of the target locator group 32 are visible through the envelope window 28 for both regular and inverted orientations of the credentials card 12 within the pocket 24.

A second bar code data strip 34 is imprinted onto the external face 26A of the envelope 26. The bar code data strip 34 represents a serial number which uniquely identifies the automobile 14 to which the envelope 26 is attached. The automobile serial number information represented by the bar code data strip 34, together with the operator credentials identifying data represented by the bar code data strip 30, are stored in the data file records in a hard disk memory 36.

The data file record associated with each unique vehicle I.D. bar code 34 includes title information, state registration number, vehicle identification number, year/make/model, owner's name, address, phone number, and authorized operators' names and driver's license numbers. The credentials data strip 30 uniquely identifies an authorized driver by name, operator I.D. number, and driver's license number. The operator I.D. number represented by the credentials data strip 30 is cross-checked against the list of operators who have been authorized possession of the automobile as identified by the second bar code data strip 34. The cross-reference is performed by the computer 18 with reference to master file data stored internally within hard disk memory 36 or in a remote access memory. In this example, the hard disk memory 36 has 40 megabyte capacity, and the ability to maintain up to 100,000 data files.

The computer 18 is a high performance general purpose computer having the following general features: 20 MHz processor clock rate, 60 MHz I/O clock rate (bus speed), zero wait-state memory, one megabyte RAM memory (100 nS access speed), and the hard disk memory 36.

The capacity of the hard disk memory 36 is dependent upon the data base size required by the user. The data base holds records which are located by performing a disk data base search using the bar codes 30, 34 as keys. The size of the records and the number of records required for the application determines the data base size. That is, the record size (bytes) times the number of records required equals the data base size. The overall disk memory capacity is the data base requirement plus capacity for the operating system, application software and data base manager Video data 20 is initially processed by a video interface and video digitizer unit 38. The video interface and digitizer unit have an onboard video RAM memory capable of holding 512×512×8-bit video frame.

A serial communications interface unit 40 controls the flow of command signals 42 issued by the computer 18 to a pan and tilt controller 44.

The video camera 22 has high resolution and is capable of scanning at least 400 lines of video data per frame. Its analog video output 20 is preferably in a standard E.I.A. format. The camera 22 preferably is equipped with an auto-iris lens 46 with motorized zoom and focus control. Zoom and focus commands 48 are generated by the computer 18 and form a part of the command signal 42. Zoom and focus controls are desired for tracking and scanning via software. The focal length properties determine the distances and light levels at which the system will effectively identify and read the target locator group 32 and bar code data groups 30, 34.

The camera 22 is mounted on the motorized pan and tilt controller 44. The pan and tilt controller provides precise movement about the vertical axis Z (pan) and the horizontal line of sight axis R (tilt) of the camera, assuming the axes pass through the center of the camera 22. Such movement allows for scanning and tracking of the target locator group 32 and bar code data groups 30, 34. The serial communications interface unit 40 provides commands according to a protocol in which a series of control bytes are sent and received between the computer 18 and pan/tilt controller 44. The pan/tilt controller 44 interprets the control bytes and creates motor drive signals, as well as zoom/focus signals 48 for precise camera movement and lens control.

The minimum illumination requirement for target acquisition and data code reading depends upon the quality of the camera and lens used. The camera 22, for example, requires an illumination level at the target of 3 luxes with a 1.4 mm lens having an infrared cut filter.

An electric eye photocell unit 50 detects the presence of the automobile 14 as it approaches the bay area of an access gate 16. The bay area is illuminated by a light source L which is mounted on top of the camera 22. As the automobile 14 enters the scan region of the camera 22, the photocell 50 detects the automobile's presence, and generates a command signal 51 which initiates the validation process.

The video interface/digitizer 38 digitizes the video signal 20 and then tests it for the presence of a video locator group 32. Upon detection of the target locator group 32, pan/tilt and zoom/focus commands 42, 48 are issued by the serial communication interface unit 40 to cause the camera 22 to zoom in and focus on the credentials card 12.

A data processor 52 reads the digitized operator identification data 30 and the vehicle identification data 34 and then performs a search of file data in the hard disk memory 36 to confirm or deny the existence of a match between that particular combination of operator credential data and vehicle I D data. If there is a match, an access granted signal 54 is generated which causes the gate 16 to open Otherwise, an access denied signal 56 is generated, which alerts the control operator that the automobile 14 requires personal evaluation.

The bar code data groups 30, 34 and the target locator group 32 must be visible, and facing the camera lens 46. The target locator group 32 contains a unique outline pattern which can be recognized by a pattern recognition algorithm stored in hard disk memory 36. This outline pattern has a specific length-to-width-to-line thickness ratio, thereby enabling recognition of the target locator group within the scanning range of the camera 22.

Pattern recognition software causes the processor 52 to analyze a digitized image which is stored within the hard disk memory 36. After the unique outline image of the target locator group 32 has been acquired, the processor 52 calculates the distance from the camera 22 to the credentials card 12 by comparing the acquired image size with the size of the reference outline pattern in memory, and relating that to a distance determination table.

The operating software then directs the camera 22 so that the bar code 30 on the credentials card 12 will be in the center of the next digitized image. Appropriate commands are generated to cause the lens 46 to zoom in and focus on the credentials card 12 to obtain maximum enlargement of the bar codes 30, 34 within the digitized image. The bar codes 30, 34 are then redigitized and the redigitized bar code data is translated to numeric information.

The target locator group (TLG) 32 has fixed dimensions for a given application. This enables the precise calculation of the location of the TLG in 3-dimensional space.

When the video camera lens 46 is set to a wide angle infinity focus is possible, allowing the initial location and sizing of the TLG 32. This initial detection has coarse resolution. The TLG 32 coordinates are calculated from the pixels or the captured image. The camera 22 is then panned and tilted by the computer 18 so as to center the TLG 32 in the captured image.

At this point, the computer 18 zooms and focuses the camera 22 to effect a 2X optical enlargement The video image is then recaptured at the 2X setting. This doubles the precision of the pixels with respect to the image, allowing for a more precise measurement of the TLG.

With this more precise measurement, the actual distance from the lens of the TLG is calculated.

This calculated distance is used as an index into a focus table which gives the exact setting for the camera focus. The computer sets the focus of the lens to this distance. Having focused the lens to the exact distance, the computer sets the zoom of the lens to maximum telescopic enlargement. This enlarges the TLG in the captured image to maximum size, which in turn gives maximum resolution of the TLG and its associated bar code. This makes it possible to interpret a bar code automatically, which could not previously be resolved due to distance and resolution.

The number derived from the vehicle I.D. bar code data group 34 is used as a record identifier in the data base stored in hard disk memory 36. That record is then retrieved from the file. The retrieved record is scanned to determine if the operator credentials bar code 30 is contained in the record. If it is found, then the access granted signal 54 is conducted through a digital input/output controller 58.

The following steps are executed by the scanning system 10 during a typical operation:
1. Power on.
2. Run pan, tilt, focus and zoom to home limits Check bay empty and close gate.
3. Initialize digitizer.
4. Capture home image, wide angle and infinity focus
5. Locate calibration target.
6. Pan, tilt, zoom and focus on target Reset 3-dimensional origin location counters.
7. Pan, tilt, zoom and focus to ready position and wait for a vehicle.
8. When vehicle is detected, the locator algorithm is executed.
9. Location and distance are returned from the algorithm, which is used to pan, tilt, zoom and focus on target credential.
10. The locator algorithm is run once more for making final adjustment to pan, tilt, zoom and focus.
11. The bar code read algorithm is then used to read the vehicle bar code and the operator bar code.
12. The data base is then searched for the vehicle data file.
13. After the vehicle number is found, the operator bar code is cross-referenced to the list of authorized operators contained within the vehicle data file.
14. Upon validation, the gate is opened.
15. The bay is monitored for the vehicle to exit, then the gate is closed.
16. The camera is homed to the ready position, and system continues at Step 7.

The effectiveness of the scanner/reader system 10 is enhanced by the target locator group 32 which is displayed closely adjacent to either the operator credentials data bar code 30 or the automobile I.D. bar code data strip 34. The target locator group 32, the operator credentials bar code data group 30 and the automobile I.D. data group 34 must appear simultaneously within the video frame of view of the camera 22 and in sufficient light to resolve the bar code segments.

The spacing and relative size of the elements of the target locator group 32 are selected to provide a pattern which is unlikely to occur in nature. The alternating dark/light elements have related but differing width and height relationships which permit fast recognition and minimum processing time. Moreover, the target locator elements 32 are large relative to the associated bar codes to allow acquisition of the credentials card from greater distances and for tracking moving bar code carriers.

Figure 7:
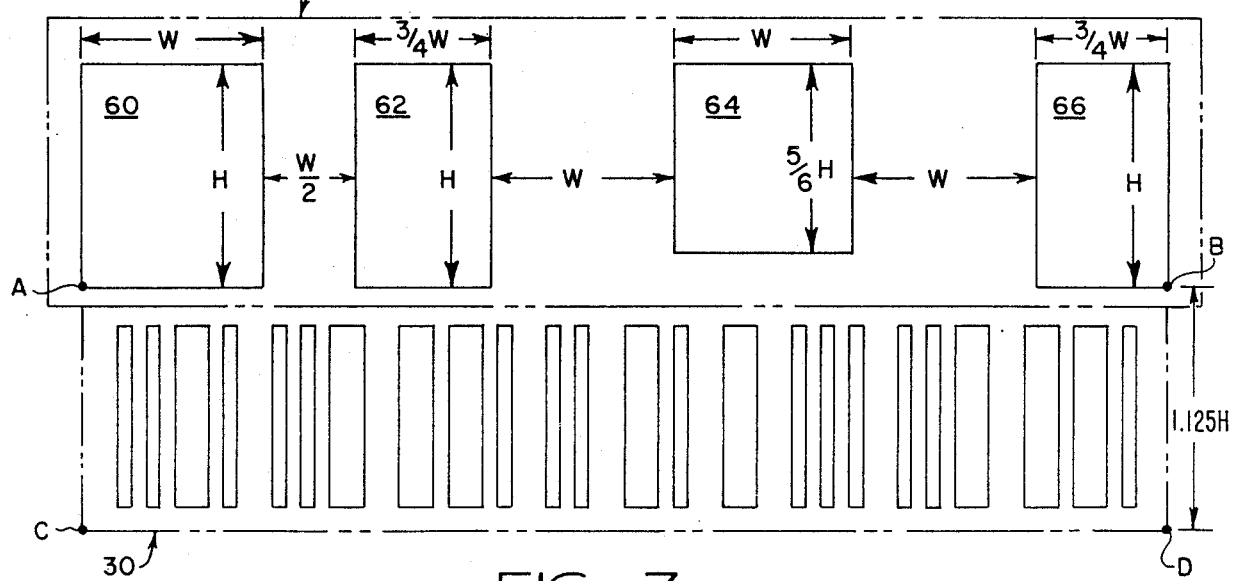
FIG. 7 is a simplified diagram which illustrates the relative dimensions of the target locator elements relative to each other and relative to the operator credentials bar code elements.

Referring now to FIGS. 3 and 7, the target locator group 32 includes four high contrast elements 60, 62, 64 and 66. The purpose of the target locator pattern 32 is to aid the video system 10 in the 3-dimensional location and acquisition of the bar codes 30, 34.

The locator pattern 32 is printed above the credentials bar code 30, although it could be placed in other orientations such as below or to the side of the credentials bar code 30. As the credentials bar code 30 is moved in various positions within the 3-dimensional viewing space, the locator pattern 32 provides an easily discernible perspective which would otherwise be difficult or impossible to achieve. The major advantages offered by the locator pattern 32 are that it is a unique pattern, not likely to appear anywhere else in the camera's view (there could be other bar codes in the view of the camera) and it is made up of elements 60, 62, 64 and 66 which are much larger than the elements of the credentials bar code 30. This makes location or the credentials bar code 30 possible even when its elements are too small to be resolved as pixels (picture elements) by the video camera. The video image dimensions determined by the camera allow the system to zoom and focus in on the credentials bar code 30 because the actual size (dimensions) of the locator pattern 32 and elements 60, 62, 64 and 66 are known. Therefore, the distance and orientation of the credentials bar code 30 can be calculated by a software algorithm.

The first step in acquiring the desired target is to capture the video image in the memory 36 of the computer 18. For example, using the digitizer 38, an image is captured as 256-thousand pixels organized as 500 lines by 512 columns. Each pixel is represented by one byte (8 bits) of memory allowing a grey scale of 256 shades ranging from 0 (black) to 255 (white). The contents of the memory are scanned line-by-line, and when a significant delta (difference of shade) is detected (white to black), this region of the image is identified as a "region of interest", meaning that it warrants closer and more detailed examination.

From this point on, the algorithm is pattern dependent. As soon as the region of interest fails to meet the proper pattern specifications, the region is abandoned and scanning continues for another region of interest. That is, the specific element dimensions that the system is searching for must fit those of the designated pattern. The pattern may be varied for different applications, but must maintain specific relationships for each individual application.

The steps in recognizing a specific locator pattern can best be described by using an example. The following is an example of a locator pattern and its associated bar code (FIG. 7). In FIG. 7, the locator pattern 32 comprises the four rectangles 60, 62, 64 and 66 positioned above the eight-digit A.N.S.I. standard "interleaved 2-of-5" credentials bar code 30. The software algorithm recognizes that this pattern has a specific size, but this information (the absolute actual size), is not used until the system 10 needs to calculate the distance from the camera lens 46 to the target locator group 32. At that time, the system 10 will direct the camera lens 46 automatically zoom in and optically enlarge the credentials bar code 30 for reading purposes.

The information necessary to identify the target locator 32 and determine its orientation to the camera 22 is found in the geometrical, spacial and dimensional relationships of the locator pattern rectangles 60, 62, 64 and 66 with respect to one another. The tests performed by the algorithm to identify the locator pattern are as follows:

(1) Scanning from left to right, the first, second and fourth rectangle elements 60, 62 and 66 have the same height H The third rectangle element 64 is approximately 5/6 the height of the other three. The identifying characteristic or feature is that the third element rectangle 64 is vertically shorter (5/6 H).

(2) The width of the second rectangle element 62 is ¾ the horizontal width W of the first rectangle element 60 and the space between these two is ½ the width W of the first rectangle element 60.

(3) The third rectangle element 64 is the same width W as the first and the spacing between the second and third rectangle elements 62, 64 is the same as the width W of the first rectangle element 60.

(4) The fourth rectangle element 66 is ¾ the width of the first rectangle element 60 and the spacing between the third and fourth rectangle elements 64, 66 is the same width W of the first rectangle element 60.

Detection of preceding four relationships establish a very high probability that the system has found the target it is searching for. The angle of the scan for the preceding tests (with respect to vertical) is determined by tracking the top and left leading edges of the first rectangle element 60.

The next series of tests determine where the region for the credentials bar code 30 of interest is located relative to the locator rectangle element group 32. This region is geometrically bounded by a parallelogram and is identified by four calculated points A, B, C and D. The upper left point A and upper right point B of the parallelogram are respectively the lower left corner of the first rectangle element 60 and the lower right corner of the fourth rectangle element 66. The lower left point C of the parallelogram is a point on a line intersecting the upper left corner of the first rectangle element 60, and the lower left corner of the first rectangle element 60. The corner point C is located below the lower left corner of the first rectangle element 60 a distance of 1.125 times the directed distance of the upper left to lower left corners of the first rectangle. The lower right point D of the parallelogram is found in the same manner using the upper right and lower right corners of the fourth rectangle element.

Other bar code zones may be identified using the same method which allows multiple bar codes to be associated to the same target locator pattern which enables these bar codes to have a specific relationship to each other.

For example, in a secured vehicle access system, a target locator group 32 with an operator bar code 30 located directly beneath it may be adhered to the windshields. This bar code would identify the vehicle. A pocket or pouch would be located beneath the bar code which would allow the driver to insert a card on which a bar code was printed. This bar code (inserted in the pouch) identifies the driver. These two numbers should appear in the data base, in the same record, thereby indicating that the vehicle is authorized entry/exit to and from a restricted area, and the driver is authorized to be operating the vehicle.

Any video line scan across the target locator element group 32 will yield a sequence of seven bars and spaces whose widths are a scaler multiple of the vector (1, ½, ¾, 1, 1, 1, and ¾).

After the VIDEO LINE SCAN detects a probable candidate target, the central processing unit 52 then reads the following data: (a) memory address of beginning of scan line in which candidate target is detected; (b) offset within line of edge of candidate target; (c) sum of squares of the widths of the bars and spaces lying within the scan across the target. The software requires that the detection circuitry locate the candidate target for several successive line scans to elevate the candidate target to probable target status After sufficient delay to insure that the entire probable target has been scanned and stored in memory, the software will obtain from memory a scan line through the center of the target and orthogonal to the direction of the original video scan lines. Measurements of bars and space widths are made in software; if the correct relationships are obtained, the probable target is elevated to definitive target status.

The following steps are taken in software to orient the target locator group 32 to a canonical orientation and size:

1. Perform an edge trace around the perimeter of the target symbol and record coordinates of edge pixels.
2. Estimate corner locations and partition edge coordinates into four sets, each consisting of a straight line segment.
3. Perform least squares estimates of equations at each of the four line segments.
4. Solve the four linear equations pair-wise simultaneously to obtain corner locations to sub-pixel accuracy.
5. Compute linear transformation which will map a canonical square to the parallelogram defined by the four line segments
6. Modify the linear transformation by including a rotation as necessary.
7. Consider a predetermined number N of the most recent bars/spaces as a potential symbol and compare the relative widths of the bars and spaces with reference data stored in memory to obtain a match quality indicator.
8. Perform valid tests on those symbols with sufficiently high match quality indicators.

Each scan line from the camera is digitized as a sequence of 512 8-bit grey level. This grey level data must be binarized to transform the entire 512 pixel line as a sequence of bars and spaces. Grey level data values are limited to the range 0–255, with 0 representing BLACK and 255 representing WHITE. By definition, an edge transition of interest is defined as a change of grey level values of more than 10 percent of the total grey level range. For a grey level range of 256, an edge transition of interest corresponds with a grey level change of 25 or more from one set of pixels to another. All other transitions, including gradual transitions, are ignored.

The target identification process involves comparison of the scanned video data with known data corresponding to the characteristics of the uniquely configured target locator group 32. Since the target locator group 32 provides a sequence of adjacent bars and spaces as specific and known relative widths, the incoming video signal 20 is binarized to render the various pixels as a sequence of bars and spaces. The processor 52 then electronically "measures" the width of the binarized bars and spaces, and thereafter compares the relative widths of the bars and spaces with the known bar space width characteristics of the locator elements 60, 62, 64 and 66.

Accordingly, the incoming video data 20 is binarized in real time to detect black-to-white and white-to-black transitions, for example in the case of a candidate target, to identify the bar space transitions corresponding thereto. The next step of the process is to measure the widths of the detected bars and spaces, followed by appropriate comparisons of such widths with the widths of the bars and spaces of the reference targets stored within memory 36. A "match" between such data indicates that a potential target has been detected. The grey scale values are then compared to detect a grey scale change which exceeds a predetermined magnitude, for example 10 percent of the grey scale range.

Figure 8:
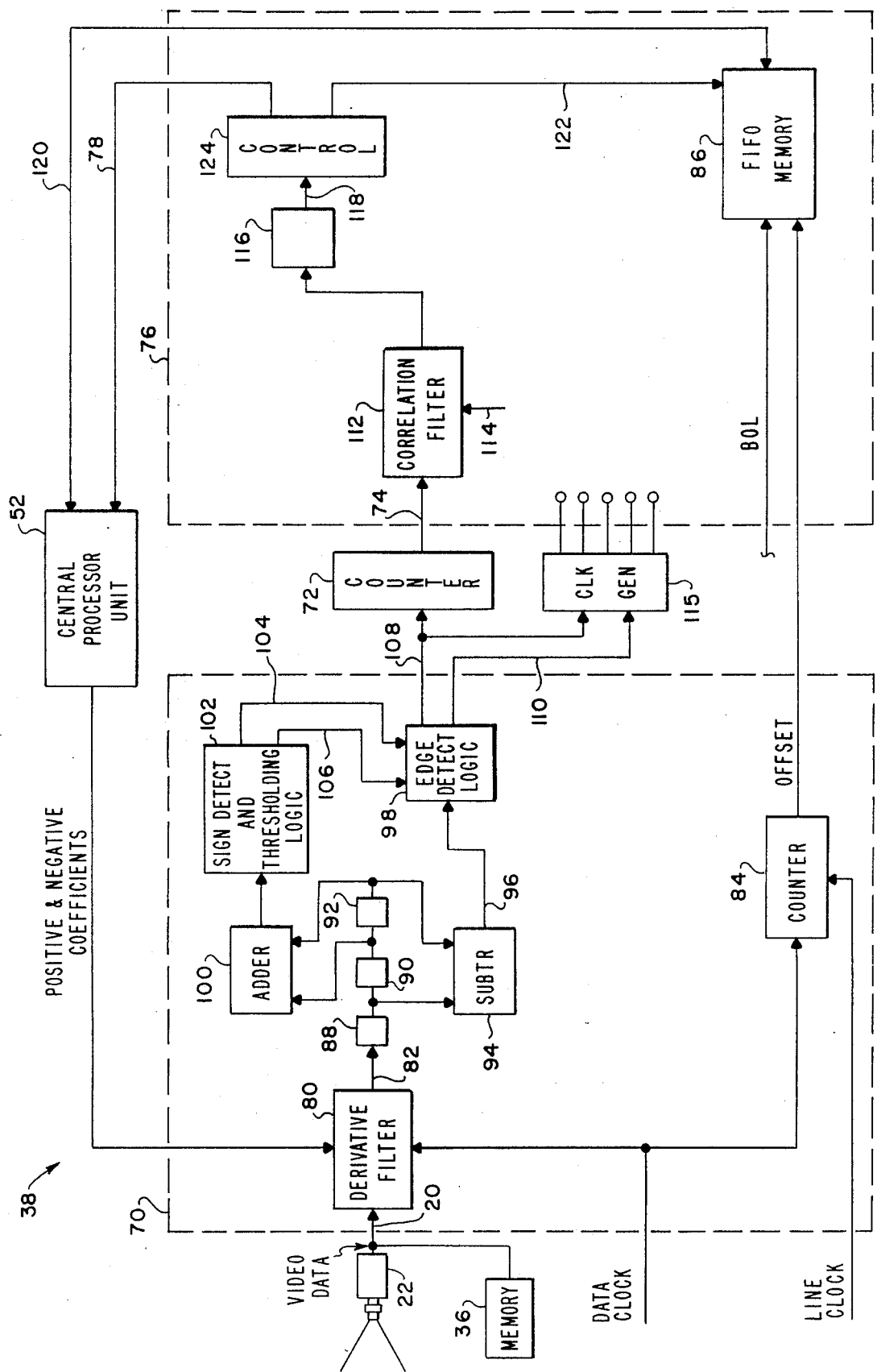
FIG. 8 is a simplified block diagram of the reader/scanner circuitry which acquires, processes and validates video data.

A block diagram schematic of a preferred embodiment of the system for implementing the target acquisition step is shown in FIG. 8. Accordingly, video data 20 generated from the line scan camera 22 is input to the video interface and digitizer circuit 38. Concurrently, the video data signal is transferred by the data bus for storage in the hard disk memory 36.

The camera 22 has conventional bias/gain and scaling circuitry so that the video data signal 20 actually constitutes a digitized binary signal, which has been appropriately adjusted for correct bias and gain as well as appropriate scaling, these binary values corresponding to the sequence of grey level values (pixels) comprising the field of view of the camera. Under circumstances where the target locator group 32 becomes a part or that scene, the video data representation of the target would constitute binary signals corresponding to the black bars and spaces presented by the target group elements. At this point in time, it should be understood that the target scanned by the camera 22 is only a candidate target, not yet having been validated as a target of interest.

Operation of the video camera 22, an edge detector network 70, a counter 72 and a target matching network 76, as well as coordination of the various functions discussed hereinafter, are all under the supervision and control of the central processor unit 52.

The edge detector network 70 includes a derivative filter 80, the function of which is to generate a signal 82 representative of the instantaneous rate of change of scene reflectants with respect to its position in the scan. Inputs to the edge detector network 70 also include a DATA CLOCK signal and a LINE CLOCK signal and a beginning of line BOL address signal which specifies the address in memory where the beginning of each new line scan from the camera 22 is stored.

The edge detector network 70 also includes a counter 84 which is clocked by the DATA CLOCK signal and is reset by the LINE CLOCK signal. The counter 84 therefore generates, at its output, an OFFSET signal corresponding to the offset within a line of the pixel data which is being inputted to the derivative filter 80. In the instance where the candidate target is detected by the matching network 76, this "offset" is stored in a section of a FIFO memory unit 86 within the target matching network 76 for subsequent input to the central processor unit 52. The output 82 of the derivative filter 80 is coupled to three sequential delay registers 88, 90 and 92.

The data at the output of the delay registers 88 and 92 are coupled to a conventional subtractor 94. The difference output signal 96 produced by the subtractor 94 is applied as one input of an edge detector logic circuit 98. The output of delay registers 90, 92 are coupled to and summed by a conventional adder network 100. The output of the adder 100 is coupled to a sign detect and threshold logic network 102 which generates an output signal 104 corresponding with the sign of the signal and a flag signal 106 which constitutes a binary "1" when the absolute value of the input signal is greater than a preset threshold level corresponding with a predetermined change in the grey level scale associated with the video pixels.

The edge detection logic network 98 generates a first output signal 108 which has a binary value of "1" when either a black-to-white or a white-to-black transition is detected, as well as a second output flag signal 110 which constitutes a binary "1" if the transition is white-to-black and binary "0" if the transition is black-to-white.

In summary, therefore, the overall edge detector network 70, in response to the incoming video data signal 20 generates an output signal 108 indicative of the presence of a black-to-white or a white-to-black transition (bar/space interface) and a signal 110 indicative of the specific type of transition (i.e. bar-to-space or space-to-bar).

The counter 72 is effective to actually measure the distances between the black-to-white and white-to-black transitions which, in the case of a candidate target, means measuring the widths of the bars and spaces of that target. Accordingly, the counter 72 is reset each time that the output signal 108 goes logic "high", indicating the occurrence of a transition, the duration of the signal at the output of the counter 72 thus being representative of the distance between transitions, i.e. the width of the bar or space, as the case may be, most recently detected. The counter can be of any configuration known to those skilled in the art, and in the preferred embodiment, utilizes programmable array logic devices.

As previously discussed, the purpose of the target matching network 76 is to compare the signal information appearing in the video data signal 20 (representing a candidate target) with stored information representative of the unique characteristics of the target locator group 32 in order to determine whether there is a "match". Specifically, the matching network 76 compares a sequential bar/space width data (or ratios) appearing at the output 74 of the counter 72 with the sequential bar/space widths (or ratios) of the target group 32.

Accordingly, the target matching network 76 includes a correlation filter 112, the filter 112 having input thereto a binary signal 114 from the central processing unit 52 representative of the bar/space widths of the candidate target, such signal thus constituting the reference pattern of such target. As previously indicated, the reference pattern (or widths ratios) for the locator target shown in FIG. 7 is represented by the vector (1, ½, ¼, 1, 1, 1, ¾).

Since the black-to-white and white-to-black transitions of the video data will occur at uneven intervals, the clock signal furnished to the various components of the target matching network 76 will necessarily be irregular. Accordingly, these clock signals are provided by a clock generator 115 in response to the transition indicator signal 108 and the type of transition indicator signal 110.

Coupled to the output of the correlation filter 112 is a "match" signal generator 116 which is effective to generate an appropriate signal, for example a logic "1" at its output 118 when the bar/space width characteristics of the data stream on data signal 74 matches the bar/space width data of the reference pattern inputted to the correlation filter.

Also included as a part of the target matching network 76 is the first in/first out (FIFO) memory 86 in data communication with the central processing unit 52 by way of data line 120 as well as in data communication by way of data line 122 with control means 124. The control means 124 is effective, in response to a "match" signal from match signal generator 116 to generate a "interrupt" signal to the central processor unit 52, as well as to instruct FIFO memory 86 to store the relevant information in memory as a consequence of this match. Such a relevant information, which is then read by the central processor unit 52 includes the offset data then existing from the output of counter 84 and the BOL (beginning of line) address.

Since the candidate target and consequently the image of the target locator group 32 and bar codes 30, 34 will in most instances be randomly oriented with respect to the camera 22, acquisition and validation is facilitated by an initial electronic transformation of the viewed image. The central processor unit 52 using software implemented algorithms locate the corner points A, B, C and D and compute an affine transformation to a standardized view. Specifically, the horizontal scan line is recognized by the target identification network 76 as defining the proper ratio of bar and space widths of the reference target, the pixel representing the intersection of the scan line with the rightmost boundary line of the target also being identified by the network. After an interrupt signal is issued to the central processor unit 52, as previously discussed, the central processor unit 52 will read from the FIFO memory 86 the address of the pixel and the width of the target as intersected by the video scan line.

The central processor unit 52 then reads from memory the grey levels of that portion of the target image represented by the intersection of the target and the scan line. The binarization threshold is set based upon the detected grey level value. The boundary of the target group 32 is then traversed using an appropriate edge following algorithm, such as the Freeman Direction Code and a record of all edge and boundary pixel coordinates is stored in memory.

Next, using an appropriate corner detection algorithm, the approximate locations of the four corners A, B, C and D which frame the operator credential bar code 30 are detected. With this information, the boundary pixels of the bar code 30 can be represented as four uniquely defined sets, each set respectively corresponding to four straight line segments defining the bar code data group 30 boundary Standard numerical linear algebra techniques are then used to calculate the equations of the least squares estimates of these line segments.

Next, a standard numerical algorithm for solving linear equations is used to compute the actual coordinates of the corners A, B, C and D of the target bar code. Standard linear algebra techniques are then used to determine the affine transformation which maps the boundary parallelogram to a square symbol of predetermined size. Using this mapping, the grey levels of the elements within the locator target group 32 are retrieved from memory. The entire image is then electronically rotated, sized and configured as necessary.

Referring now to FIGS. 9, 10 and 11, an alternative target locator and credentials card arrangement is illustrated. In this arrangement, the target locator group 32 and the vehicle I.D. bar code 34 are imprinted onto the face of the carrier envelope 26 and are always exposed on the automobile 14. The operator credentials card 12, on the other hand, carries only the operator identification bar code data strip 30. The operator bar code data strip 30 is printed in inverted relation on the lower half of the credentials card 12 so that the operator bar code data strip 30 is visible through the envelope window 28 for both regular and inverted orientations of the credentials card within the pocket 24.

Although a particular embodiment of the invention has been illustrated and described, other modifications and variations may occur to those skilled in the art, and the basic concept of the invention may be practiced in other forms. Consequently, it is intended that the claims be interpreted to cover such modifications, variations and forms.

What is claimed is:

1. In a reader/scanner system for automatically reading bar code data elements displayed on a carrier, the improvement comprising:
    a uniquely configured target locator including a group of locator elements having predetermined and known characteristics disposed on said carrier in association with said bar code data elements, said target group including a set of serially spaced rectangles superimposed on a high contrast background, said rectangles when intersected by a line through the center of said target group defining a sequence of contrasting bars and spaces, said bars and spaces having predetermined widths along said centerline; and,
    means responsive to the respective width ratios of said locator elements and spaces for initially detecting the presence of said target locator group and thereafter reading the bar code data elements adjacent to said target locator group.

2. The improvement as defined in claim 1, including electronic means for determining the width ratio sequence of adjacent bars and spaces of said detected target locator group and comparing said determined sequence with a predetermined width ratio sequence of adjacent bars and spaces of a reference target locator group.

3. The improvement as defined in claim 1, wherein the width and spacing of the target locator elements are substantially greater than the corresponding bar width and spacing of elements within the information bar code.

4. The improvement as defined in claim 1, wherein said target locator group includes first, second and third locator elements, said first, second and third locator elements being spaced apart with respect to each other along a straight line, wherein the spacing distances between the first and second locator elements and the second and third locator elements are unequal, and wherein the height of one locator element is unequal to the height of the other locator elements.

5. The improvement as defined in claim 1, wherein said target locator group includes first, second, third and fourth locator elements spaced apart with respect to each other along a straight line, which when intersected by said straight line, defines a sequence of contrasting bars and spaces whose widths
    are a scaler multiple of the vector $(1, \frac{1}{2}, \frac{3}{4}, 1, 1, 1, \frac{3}{4})$, respectively.

6. The improvement as defined in claim 5, one of said rectangular elements having a height which is unequal to the height of the other locator elements.

7. The improvement as defined in claim 1, including means for performing a real time calculation to determine corner location points of a boundary parallelogram within which said bar code data elements are displayed, wherein said calculated points are determined with reference to said target locator elements.

8. The improvement as defined in claim 7, said boundary parallelogram having corner boundary points A, B, C and D, and wherein said target locator group includes first, second, third and fourth locator elements spaced apart with respect to each other along a straight line, the upper left boundary point A and the upper right boundary point B of the boundary parallelogram are respectively the lower left corner of the first locator element and the lower right corner of the fourth locator element, and the lower left boundary point C of the boundary parallelogram being a point on a line intersecting the upper left and lower left corners of the first locator element, with the boundary point C being located below the lower left corner of the first locator element at a predetermined distance times the directed distance of the upper left to lower left corners of the first locator element, and the lower right boundary point D of the boundary parallelogram being located along a line passing through the upper right and lower right corners of the fourth locator rectangle element, and spaced from said boundary point C by a distance factor proportional to the directed distance of the upper right to lower right corners of the fourth locator element.

9. The improvement as defined in claim 1, including electronic means for determining the corner points of a boundary parallelogram within which said bar code data elements are displayed, said corner location boundary points being calculated with reference to said target locator elements, and said detection means being enabled to read the bar code data elements within said boundary parallelogram only in response to a determination that the width ratio sequence of adjacent bars and spaces of said detected target locator group is identical to a known width ratio sequence of adjacent bars and spaces of a reference target locator group.

10. Apparatus for detecting unauthorized possession of mobile or portable property comprising, in combination:
    video scanner/reader means for reading bar code information;
    container means adapted for attachment to mobile or portable property, said container means being adapted for securing and displaying a credentials card;
    a first group of bar code data elements disposed on said container means, said first group of bar code data elements uniquely identifying said property to which the container means is to be attached, said first group of bar code data elements being readable by said video scanner/reader;
    a credentials card adapted to be secured onto said container means, said credentials card having a second group of bar code data elements displayed on said credentials card, said second group of bar code data elements being displayed in association with said first group of bar code data elements, said second group having credentials information which uniquely identifies an individual who is authorized possession or control of mobile or portable property to which said container means is attached; and,
    control means coupled to said video scanner/reader means, said control means including memory means having stored therein a set of data files corresponding with said first group of bar code data elements and said second group of bar code data elements, said control means including means solely responsive to a predetermined correspondence between said credentials data and said property data for generating a signal confirming or denying the existence of said correspondence.

11. The improvement as defined in claim 10, including a uniquely configured target locator having a group of locator elements of predetermined and known characteristics disposed on said credentials card immediately adjacent to said first group of bar code data elements, said target locator group including a set of rectangles superimposed on a high contrast background, said rectangles when intersected by a line through the center of said target group defining a sequence of contrasting bars and spaces, said bars and spaces having predetermined widths along said centerline; and,
    said control means including means responsive to the respective width ratios of said locator elements and spaces for detecting the presence of said target locator group and thereafter reading the first group of bar code data elements associated with said target locator group.

12. Apparatus as defined in claim 10, including a uniquely configured target locator having a group of locator elements having predetermined and known characteristics disposed on said container means immediately adjacent said second group of bar code data elements, said target group including a set of rectangles superimposed on a high contrast background, said rectangles when intersected by a line through the center of said target group defining a sequence of contrasting bars and spaces, said bars and spaces having predetermined widths along said centerline; and,
    said control means including means responsive to the respective width ratios of said locator elements and spaces for detecting the presence of said target locator group and thereafter reading the second group of bar code data elements associated with said target locator group.

* * * * *